United States Patent
Suzuki et al.

(10) Patent No.: US 12,264,635 B2
(45) Date of Patent: Apr. 1, 2025

(54) FUEL INJECTION CONTROL DEVICE

(71) Applicant: TOYOTA JIDOSHA KABUSHIKI KAISHA, Toyota (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/537,820

(22) Filed: Dec. 13, 2023

(65) Prior Publication Data

US 2024/0200506 A1 Jun. 20, 2024

(30) Foreign Application Priority Data

Dec. 20, 2022 (JP) ................................ 2022-203313

(51) Int. Cl.
*F02D 41/40* (2006.01)

(52) U.S. Cl.
CPC ...... *F02D 41/401* (2013.01); *F02D 2200/021* (2013.01)

(58) Field of Classification Search
CPC .. F02D 41/0027; F02D 41/401; F02D 19/024; F02D 2200/301
See application file for complete search history.

(56) References Cited

U.S. PATENT DOCUMENTS

| | | | | |
|---|---|---|---|---|
| 2004/0107946 A1* | 6/2004 | Kobayashi | ............ | F02D 41/182 123/480 |
| 2006/0016430 A1* | 1/2006 | Sadakane | ............ | F02D 41/3076 123/431 |
| 2007/0062476 A1* | 3/2007 | Ota | ........ | F02B 23/104 123/179.4 |
| 2009/0078033 A1* | 3/2009 | Iwai | ........ | G01K 15/00 73/114.34 |
| 2024/0110534 A1* | 4/2024 | Suzuki | ................ | F02D 41/0027 |

FOREIGN PATENT DOCUMENTS

JP 2013217354 A 10/2013

* cited by examiner

*Primary Examiner* — John Kwon

(57) ABSTRACT

A fuel injection control device is configured to control fuel injection of an injector attached to a cylinder head of an internal combustion engine and coupled to a delivery pipe. The fuel injection control device includes processing circuitry configured to execute an injection duration calculation process of calculating an injection duration of the injector required for injection of a requested amount of fuel. The injection duration calculation process includes calculating the injection duration such that the injection duration is longer when a temperature difference between the cylinder head and the delivery pipe is a first value than when the temperature difference is a second value smaller than the first value.

4 Claims, 3 Drawing Sheets

FUEL INJECTION CONTROL DEVICE

BACKGROUND

1. Field

The present disclosure relates to a fuel injection control device that controls fuel injection of an internal combustion engine.

2. Description of Related Art

An internal combustion engine has been known that includes an injector attached to a cylinder head and a delivery pipe provided outside the cylinder head. The injector for this type of internal combustion engine is fixed at one end to the cylinder head and at the other end to the delivery pipe. Therefore, a large temperature difference between the cylinder head and the delivery pipe may cause thermal distortion in the injector due to the difference in thermal expansion between the cylinder head and the delivery pipe. Japanese Laid-Open Patent Publication No. 2013-217354 describes a technique for suppressing thermal distortion of an injector caused by a difference in thermal expansion between a cylinder head and a delivery pipe.

Thermal distortion as described above increases the sliding resistance of sliding components of the injector such as a needle. This changes the injection characteristics of the injector. Therefore, when there is a large temperature difference between the cylinder head and the delivery pipe, the control accuracy of the fuel injection amount may deteriorate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel injection control device is configured to control fuel injection of an injector attached to a cylinder head of an internal combustion engine and coupled to a delivery pipe. The fuel injection control device includes processing circuitry configured to execute an injection duration calculation process of calculating an injection duration of the injector required for injection of a requested amount of fuel. The injection duration calculation process includes calculating the injection duration such that the injection duration is longer when a temperature difference between the cylinder head and the delivery pipe is a first value than when the temperature difference is a second value smaller than the first value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a fuel injection control device will be described in detail with reference to FIGS. 1 to 4.

Fuel Injection Control Device

Figure 1:
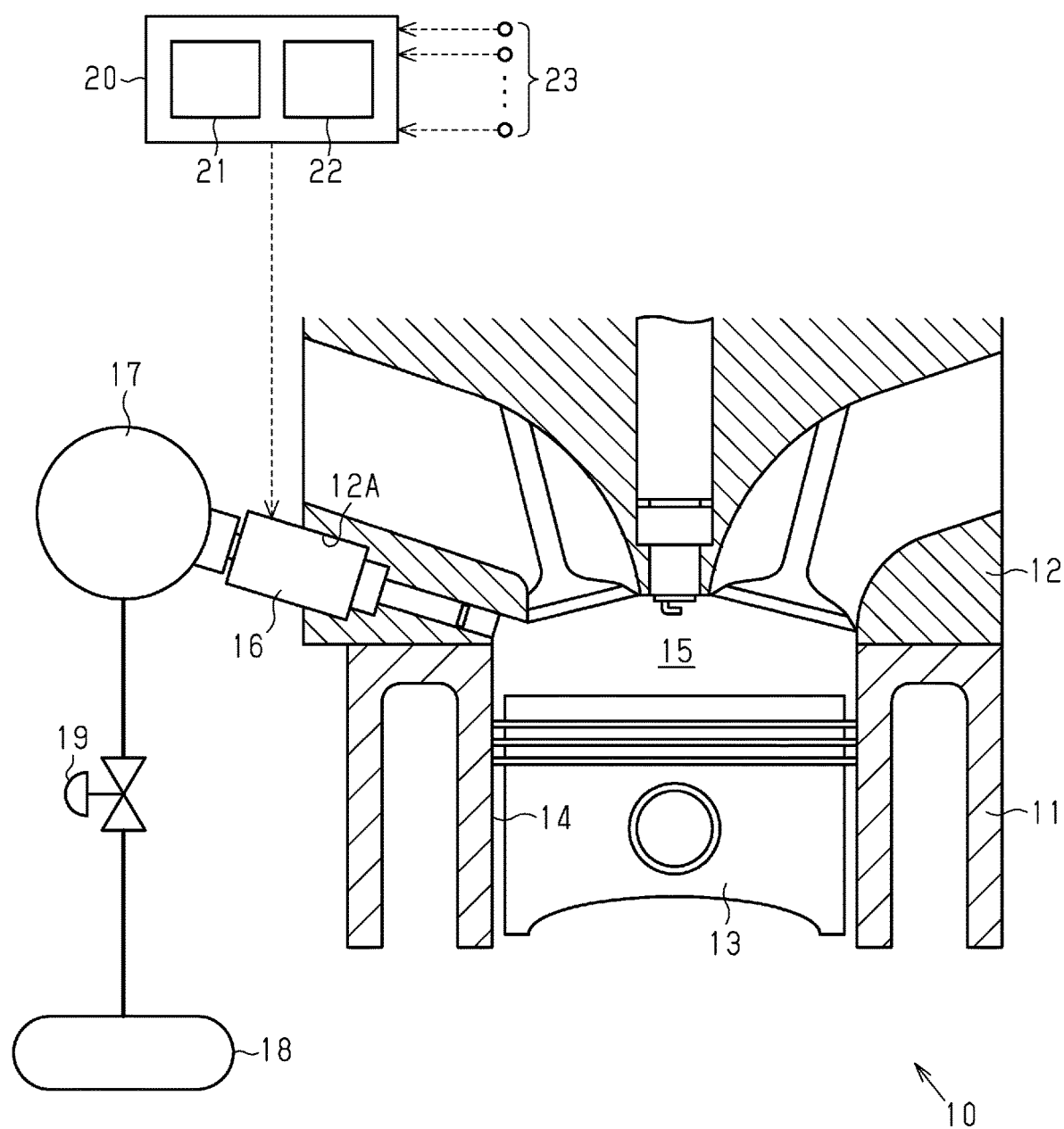
FIG. 1 is a schematic diagram showing a fuel injection control device according to one embodiment.

First, the configuration of the fuel injection control device according to the present embodiment will be described with reference to FIG. 1. The fuel injection control device of the present embodiment is applied to an in-cylinder injection type internal combustion engine 10 that uses hydrogen gas as fuel. The internal combustion engine 10 is mounted on a vehicle.

The internal combustion engine 10 includes a cylinder block 11 and a cylinder head 12. The cylinder block 11 is provided with a cylinder 14 accommodating a piston 13. A combustion chamber 15 for combusting the hydrogen gas is formed inside the cylinder 14. The internal combustion engine 10 includes an injector 16 that injects hydrogen gas into a cylinder 14. The cylinder head 12 is provided with a mounting hole 12A for mounting the injector 16. The injector 16 is attached to the cylinder head 12 in a state in which an end portion having an injection hole is inserted into the mounting hole 12A. A delivery pipe 17 is provided outside the cylinder head 12 of the internal combustion engine 10. A hydrogen tank 18 is connected to the delivery pipe 17 via a pressure regulator 19. The pressure regulator 19 reduces the pressure of the high-pressure hydrogen stored in the hydrogen tank 18 to a prescribed supply pressure and supplies the hydrogen to the delivery pipe 17. An end portion of the injector 16 opposite to the injection port is connected to the delivery pipe 17.

The fuel injection control device of the present embodiment controls the fuel injection of the injector 16 in the internal combustion engine 10. The fuel injection control device includes an electronic control unit 20. The electronic control unit 20 includes a processor 21 and a memory 22. The memory 22 stores a program and data for controlling fuel injection of the injector 16. The processor 21 reads a program from the memory 22 and executes the program, whereby the electronic control unit 20 performs various processes for controlling fuel injection. Detection signals of various sensors 23 installed in various parts of the vehicle are input to the electronic control unit 20. The sensors 23 include sensors that detect the temperature of the coolant of the internal combustion engine 10, the temperature of the lubricant of the internal combustion engine 10, the temperature of the outside air, and the temperature of the hydrogen gas in the delivery pipe 17. The sensor 23 includes sensors that detect parameters indicating the operating state of the internal combustion engine 10, such as the pressure of the hydrogen gas in the delivery pipe 17, the crank angle of the internal combustion engine 10, and the intake air amount. The sensor 23 includes a sensor for detecting a parameter indicating a traveling state of the vehicle, such as an accelerator pedal operation amount and a vehicle speed. The electronic control unit 20 determines the engine speed, which is the rotational speed of the internal combustion engine 10, based on the detection signal of the crank angle.

The electronic control unit 20 determines a requested value of the hydrogen gas injection amount based on the detection results of the sensors 23. The electronic control unit 20 calculates the injection duration of the injector 16 required to inject the hydrogen gas in an amount equal to the determined requested value. The electronic control unit 20 commands the injector 16 to inject hydrogen gas in the calculated injection duration. The electronic control unit 20 controls the hydrogen gas injection amount of the internal combustion engine 10 through the processing described above. That is, the electronic control unit 20 controls the fuel injection of the injector 16 by calculating the injection duration of the injector 16 required for the requested amount of fuel injection.

Injection Duration Calculation Routine

Figure 2:
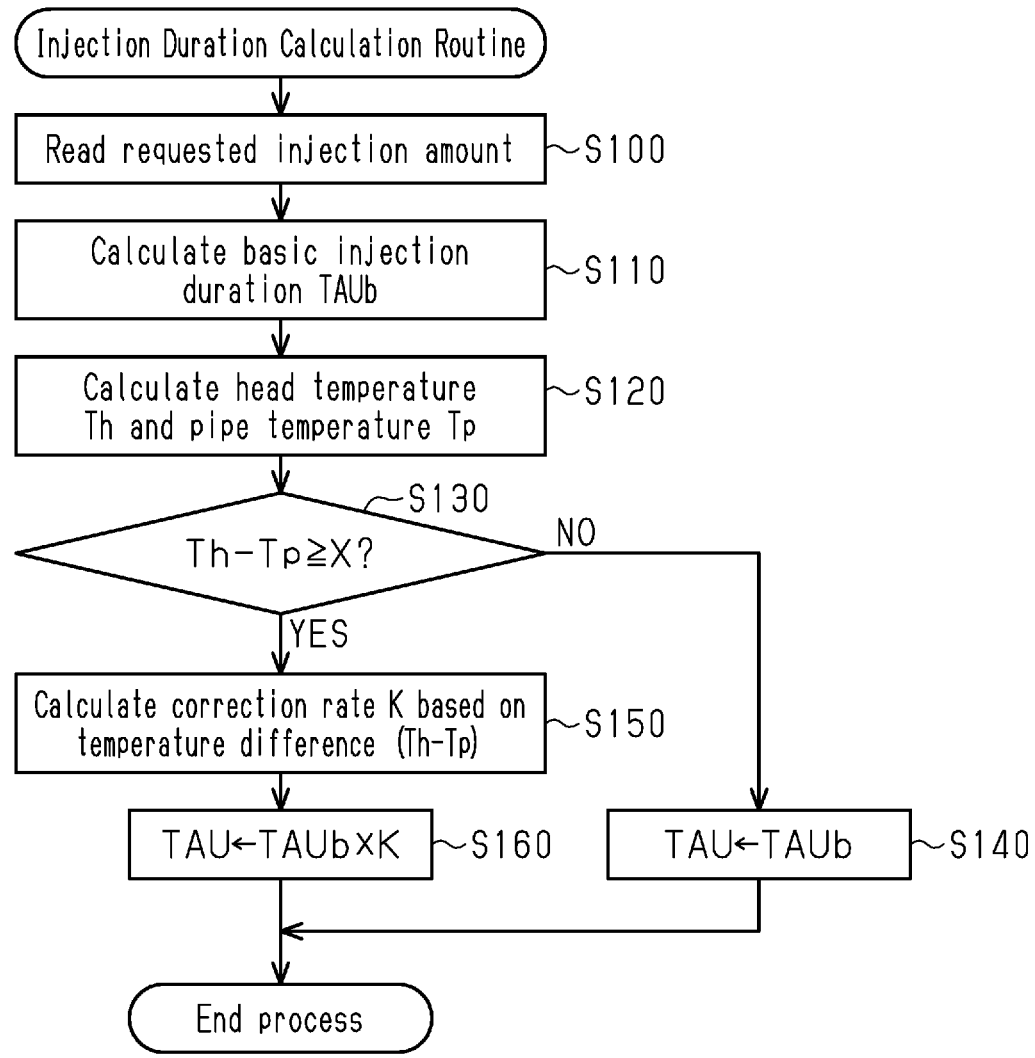
FIG. 2 is a flowchart of an injection duration calculation routine executed by the fuel injection control device of FIG. 1.

Hereinafter, a process of the electronic control unit 20 for calculating the injection duration in the control of the fuel injection amount will be described with reference to FIGS. 2 to 4. FIG. 2 shows a flowchart of an injection duration calculation routine executed by the electronic control unit 20 to calculate the injection duration. The electronic control unit 20 executes the routine at prescribed control intervals during the operation of the internal combustion engine 10.

When this routine is started, the electronic control unit 20 first reads a requested injection amount in step S100. In another routine, the electronic control unit 20 determines the requested output of the internal combustion engine 10 based on the accelerator pedal operation amount, the vehicle speed, and the like. The electronic control unit 20 calculates the injection amount of hydrogen gas required to generate the requested output as a value of the requested injection amount based on the requested output, the engine rotation speed, and the like.

Next, in step S110, the electronic control unit 20 calculates a basic injection duration TAUb. The basic injection duration TAUb represents a hydrogen gas injection duration of the injector 16 required to inject the requested injection amount of hydrogen gas in a rated state in which the thermal distortion of the injector 16 does not occur. The electronic control unit 20 calculates the basic injection duration TAUb based on the requested injection amount, the pressure and temperature of the hydrogen gas in the delivery pipe 17, and the like.

In the next step S120, the electronic control unit 20 calculates the head temperature Th and the pipe temperature Tp. The head temperature Th represents an estimated temperature of the cylinder head 12. More specifically, the head temperature Th represents an estimated temperature of a portion of the cylinder head 12 around the mounting hole 12A of the mounting hole for the injector 16. The pipe temperature Tp represents an estimated temperature of the delivery pipe 17. The electronic control unit 20 calculates the head temperature Th based on the temperatures of the lubricating oil and the cooling water of the internal combustion engine 10, the engine rotation speed, and the requested output. The electronic control unit 20 calculates the pipe temperature Tp based on the outside air temperature and the temperature of the hydrogen gas in the delivery pipe 17.

Subsequently, in step S130, the electronic control unit 20 determines whether or not the difference between the head temperature Th and the pipe temperature Tp (Tp=Th−Tp) is greater than or equal to a prescribed threshold value X. Hereinafter, the difference between the head temperature Th and the pipe temperature Tp is referred to as a temperature difference $\Delta T$.

When the temperature difference $\Delta T$ is less than the threshold value X (S130: NO), the electronic control unit 20 sets the value of the basic injection duration TAUb as the value of the command injection duration TAU in step S140. The command injection duration TAU represents a command value of the injection duration of hydrogen gas to the injector 16.

On the other hand, when the temperature difference $\Delta T$ is greater than or equal to the threshold value X (S130: YES), the electronic control unit 20 proceeds to step S150. In step S150, the electronic control unit 20 calculates a correction rate K based on the temperature difference $\Delta T$. In the following step S160, the electronic control unit 20 sets a value (TAUb×K) obtained by multiplying the basic injection duration TAUb by the correction rate K as a value of the command injection duration TAU.

After setting the command injection duration TAU in step S140 or step S160, the electronic control unit 20 ends the processing of this routine in the current control cycle. Thereafter, the electronic control unit 20 commands the injector 16 to inject hydrogen gas for a period corresponding to the command injection duration TAU.

Operation and Advantages of Embodiment

Operation and advantages of the present embodiment will now be described.

During operation of the internal combustion engine 10, the cylinder head 12 receives heat generated by combustion of the hydrogen gas in the combustion chamber 15. Therefore, during the operation of the internal combustion engine 10, the temperature difference $\Delta T$ between the delivery pipe 17 disposed outside the cylinder head 12 and the cylinder head 12 may increase. When the temperature difference $\Delta T$ increases, the difference in the amount of thermal expansion between the cylinder head 12 and the delivery pipe 17 increases. The injector 16 is installed in the internal combustion engine 10 in a state in which an end portion having a nozzle hole is attached to the cylinder head 12 and an end portion opposite to the nozzle hole is connected to the delivery pipe 17. Therefore, when the temperature difference $\Delta T$ increases, the thermal distortion of the injector 16 increases. When the thermal distortion increases, the sliding resistance of the sliding components in the injector 16 increases. As a result, the injection rate of the hydrogen gas of the injector 16 decreases.

The injection rate is the amount of hydrogen gas injected by the injector 16 per unit time. As described above, the electronic control unit 20 calculates the injection duration required for the hydrogen gas injection corresponding to the requested injection amount as the value of the basic injection duration TAUb. The basic injection duration TAUb is calculated on the assumption that thermal distortion does not occur in the injector 16. Therefore, when the injection rate decreases due to thermal distortion, the amount of hydrogen gas that can be injected during the basic injection duration TAUb does not reach the requested injection amount.

In the case of an injector for injecting liquid fuel, a sliding surface of a sliding component is lubricated by fuel. On the other hand, in the case of an injector that injects a gaseous fuel such as hydrogen gas, the sliding surfaces of the sliding parts are not lubricated by the fuel. Therefore, in the injector that injects the gaseous fuel, the influence of the thermal distortion on the injection rate is likely to be larger than that of the injector that injects the liquid fuel.

As an injector attached to a cylinder head, there is an injector for port injection which injects fuel into an intake port. The in-cylinder injection type injector is attached to a portion closer to the combustion chamber than the port injection type injector. Therefore, in the in-cylinder injection type injector, the temperature of a portion of the cylinder head around the injector tends to be higher than that in the port injection type injector. Therefore, the in-cylinder injection type injector is likely to have a larger thermal distortion than the port injection type injector.

The injector 16 of the present embodiment is configured to inject hydrogen gas, which is gaseous fuel, into the cylinder 14. Therefore, in the injector 16 of the present embodiment, the change in the injection rate due to the thermal distortion is likely to be large.

Figure 3:
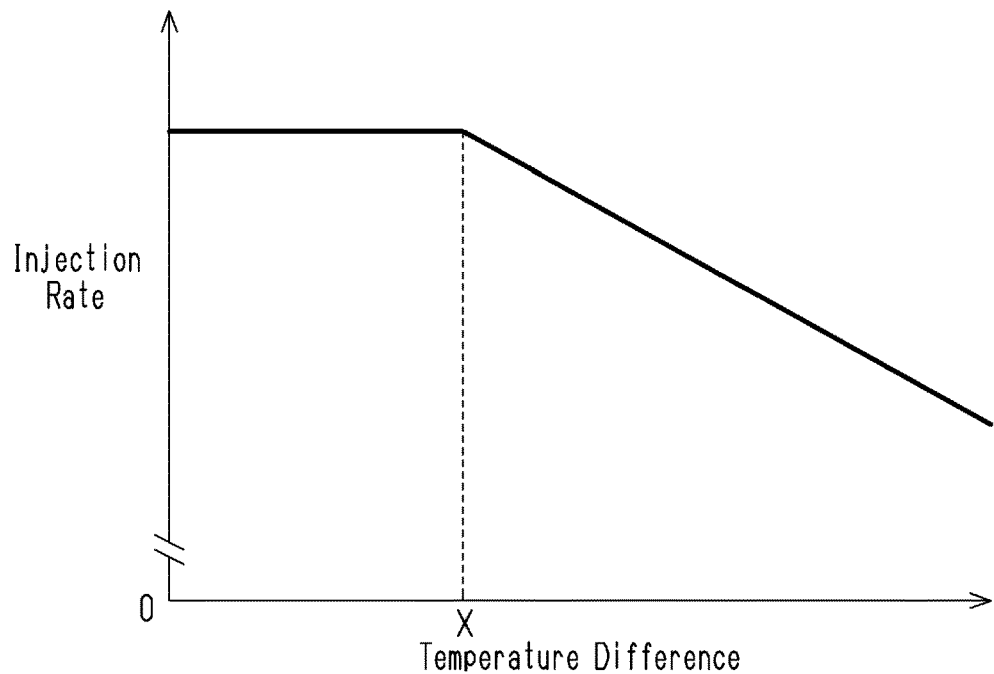
FIG. 3 is a graph showing a relationship between a temperature difference of the cylinder head and the delivery pipe shown in FIG. 1 and an injection rate of an injector.

FIG. 3 shows the relationship between the temperature difference $\Delta T$ between the cylinder head 12 and the delivery pipe 17 and the injection rate of the injector 16. The injection rate of the injector 16 varies depending on the temperature and pressure of the hydrogen gas supplied from the delivery pipe 17. Here, in order to simplify the description, it is assumed that the temperature and the pressure of the hydrogen gas supplied from the delivery pipe 17 to the injector 16 are maintained constant.

The injector 16 is designed to operate as intended despite slight variations in component geometry. Therefore, the injection characteristic of the injector 16 is maintained at the rated characteristic until the thermal distortion exceeds a certain level. Therefore, when the temperature difference $\Delta T$ is less than the specific value, the injection rate of the injector 16 is maintained substantially constant. On the other hand, in a range in which the temperature difference $\Delta T$ is greater than or equal to the specific value, the thermal distortion becomes large enough to affect the injection characteristics of the injector 16. Therefore, in a range where the temperature difference $\Delta T$ is greater than or equal to a specific value, the injection rate of the injector 16 gradually decreases in accordance with the increase in the temperature difference $\Delta T$. In the present embodiment, the upper limit value of the temperature difference $\Delta T$ at which the rated injection rate can be maintained is set as the value of the above-described threshold value X.

Figure 4:
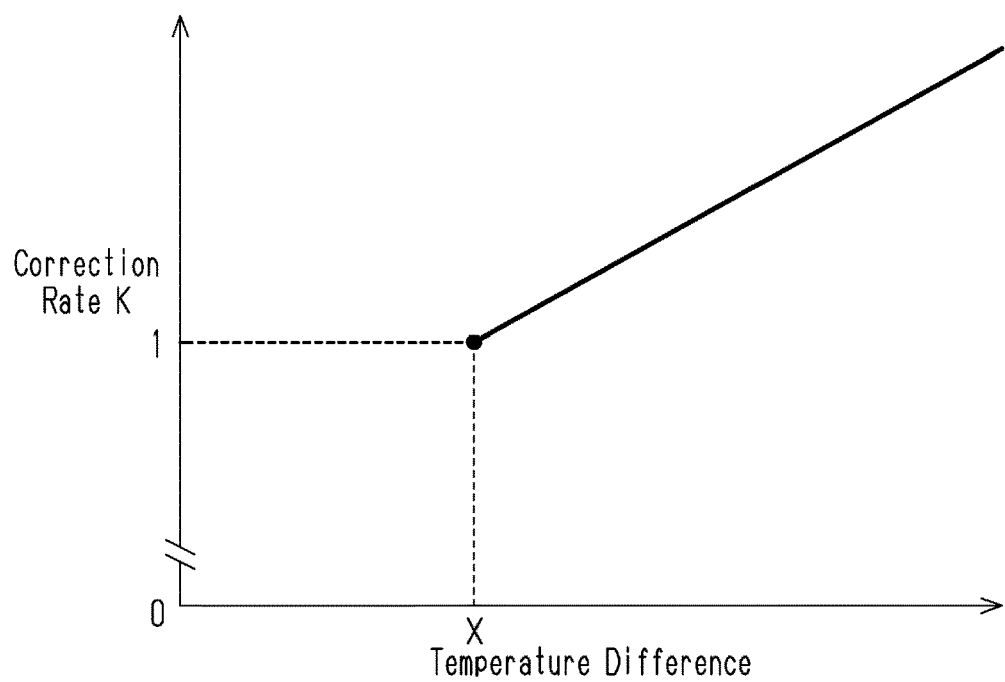
FIG. 4 is a graph showing a relationship between a temperature difference of the cylinder head and the delivery pipe shown in FIG. 1 and a correction rate of an injection duration.

FIG. 4 shows the relationship between the temperature difference $\Delta T$ and the correction rate K calculated by the electronic control unit 20 in step S150 of FIG. 2. Step S150 is executed only when the temperature difference $\Delta T$ is greater than or equal to the threshold value X. When the temperature difference $\Delta T$ is equal to the threshold value X, the electronic control unit 20 calculates 1 as the value of the correction rate K. The electronic control unit 20 calculates, as the value of the correction rate K, a value that gradually increases from 1 as the temperature difference $\Delta T$ gradually increases from a value equal to the threshold value X. The injection rate of the injector 16 when the temperature difference $\Delta T$ is less than the threshold value X is defined as a rated injection rate. The ratio of the injection rate of the injector 16 at each temperature difference $\Delta T$ to the rated injection rate is defined as a change rate C of the injection rate due to thermal distortion. The electronic control unit 20 calculates a value that is the reciprocal of the change rate C at each temperature difference $\Delta T$ as the value of the correction rate K at each temperature difference $\Delta T$.

In the injection duration calculation routine of FIG. 2, when the temperature difference $\Delta T$ is less than the threshold value X (S130: NO), the electronic control unit 20 sets the value of the command injection duration TAU to the value of the basic injection duration TAUb (S140). On the other hand, when the temperature difference $\Delta T$ is greater than or equal to the threshold value X (S130: YES), the electronic control unit 20 calculates the correction rate K based on the temperature difference $\Delta T$ (S150). The electronic control unit 20 calculates a value obtained by multiplying the basic injection duration TAUb by the correction rate K as a value of the command injection duration TAU (S160). In step S150, the electronic control unit 20 calculates, as the value of the correction rate K, a value greater than or equal to 1 that is larger when the temperature difference $\Delta T$ is relatively large than when the temperature difference $\Delta T$ is relatively small. In this manner, in the injection duration calculation routine, the electronic control unit 20 executes the injection duration calculation process in which a longer time is calculated as the injection duration when the temperature difference $\Delta T$ between the cylinder head 12 and the delivery pipe 17 is relatively large than when the temperature difference $\Delta T$ is relatively small. For example, the injection duration is longer when the temperature difference $\Delta T$ is a first value than when the temperature difference $\Delta T$ is a second value smaller than the first value. This compensates for the reduction in the fuel injection amount due to a decrease in the injection rate caused by thermal distortion, by extending the injection duration. Therefore, it is possible to suppress deterioration of the control accuracy of the fuel injection amount due to thermal distortion of the injector 16 caused by a difference in thermal expansion between the cylinder head 12 and the delivery pipe 17.

In the present embodiment, the injection duration calculation process is a process of performing correction to increase the command injection duration TAU when the temperature difference $\Delta T$ is greater than or equal to the threshold value X. Therefore, the relationship between the temperature difference $\Delta T$ and the injection rate of the injector 16 as shown in FIG. 3 can be reflected in the correction for increasing the command injection duration TAU in the injection duration calculation process.

Other Embodiments

The present embodiment may be modified as follows. The present embodiment and the following modifications can be combined as long as the combined modifications remain technically consistent with each other.

The temperature of the hydrogen gas in the delivery pipe 17 may be indirectly obtained based on the detection signal of the internal pressure of the hydrogen tank 18.

In the injection duration calculation routine of FIG. 2, the head temperature Th and the pipe temperature Tp may not be individually calculated, but the temperature difference $\Delta T$ may be directly calculated based on parameters used for these calculations. The cylinder head 12 and the delivery pipe 17 may be respectively provided with temperature sensors to directly detect the head temperature Th and the pipe temperature Tp.

The fuel injection control of the above-described embodiment can also be applied to an injector that injects gas fuel other than hydrogen gas, such as CNG or LPG, and an injector that injects liquid fuel, such as gasoline fuel or light oil. In the injector that injects the gaseous fuel other than the hydrogen gas, since the sliding surface of the sliding component is not lubricated by the fuel, similarly to the injector 16 that injects the hydrogen gas, the influence of the thermal distortion of the injector on the injection characteristics tends to be large. On the other hand, in the injector for injecting the liquid fuel, the sliding surface is lubricated by the fuel, but if the thermal distortion becomes large beyond a certain degree, the injection characteristic changes. Therefore, the fuel injection control device of the above-described embodiment exhibits the same effect even when an injector that injects gas fuel or liquid fuel other than hydrogen gas is a control target.

The fuel injection control of the above embodiment can also be applied to an internal combustion engine provided with a port injection type injector. Even in an internal combustion engine including a port injection type injector, a temperature difference between a cylinder head and a delivery pipe may become large, and in such a case, thermal distortion of the injector occurs. Therefore, even when the port injection type injector is the control target, the fuel injection control device of the above-described embodiment exhibits the same effect.

The fuel injection control device is not limited to one realized by the electronic control unit 20 including the processor 21 and the memory 22. For example, the fuel injection control device may include a dedicated hardware circuit (e.g. an application specific integrated circuit: ASIC) that executes at least part of the processes executed in the above-described embodiment. That is, the fuel injection control device may be processing circuitry that includes any one of the following configurations (a) to (c).
  (a) Processing circuitry including at least one processor that executes all of the above-described processes according to programs and at least one program storage device such as a ROM that stores the programs.
  (b) Processing circuitry including at least one processor and at least one program storage device that execute part of the above-described processes according to the programs and at least one dedicated hardware circuit that executes the remaining processes.
  (c) Processing circuitry including at least dedicated hardware circuit that executes all of the above-described processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel injection control device configured to control fuel injection of an injector attached to a cylinder head of an internal combustion engine and coupled to a delivery pipe, the fuel injection control device comprising:
    processing circuitry configured to execute an injection duration calculation process of calculating an injection duration of the injector required for injection of a requested amount of fuel,
    wherein the injection duration calculation process includes calculating the injection duration such that the injection duration becomes longer as a temperature difference between the cylinder head and the delivery pipe becomes larger.

2. The fuel injection control device according to claim 1, wherein the injection duration calculation process includes correcting the injection duration such that the injection duration is increased when the temperature difference is greater than or equal to a prescribed threshold value.

3. The fuel injection control device according to claim 1, wherein the injector is configured to inject fuel into a cylinder.

4. The fuel injection control device according to claim 1, wherein the injector is configured to inject gaseous fuel.

* * * * *